US010318315B2

(12) United States Patent
Shah

(10) Patent No.: US 10,318,315 B2
(45) Date of Patent: Jun. 11, 2019

(54) SYSTEM AND METHOD FOR SWITCH MANAGEMENT

(71) Applicant: Dell Products L.P., Round Rock, TX (US)

(72) Inventor: Haresh Shah, Los Altos Hills, CA (US)

(73) Assignee: Dell Products L.P., Round Rock, TX (US)

( * ) Notice: Subject to any disclaimer, the term of this patent is extended or adjusted under 35 U.S.C. 154(b) by 117 days.

(21) Appl. No.: 15/254,950

(22) Filed: Sep. 1, 2016

(65) Prior Publication Data

US 2016/0371100 A1    Dec. 22, 2016

Related U.S. Application Data

(63) Continuation of application No. 13/917,553, filed on Jun. 13, 2013, now Pat. No. 9,477,276.

(51) Int. Cl.
*G06F 1/20* (2006.01)
*G06F 9/445* (2018.01)
(Continued)

(52) U.S. Cl.
CPC .......... *G06F 9/44505* (2013.01); *G06F 1/206* (2013.01); *G06F 1/26* (2013.01); *H04L 41/12* (2013.01)

(58) Field of Classification Search
CPC ........ G06F 1/206; G06F 1/26; G06F 9/44505; H04L 41/12
See application file for complete search history.

(56) References Cited

U.S. PATENT DOCUMENTS 5,226,120 A    7/1993  Brown .......................... 709/224
5,490,252 A *  2/1996  Macera ............... H04L 12/5692
                                                    370/402

(Continued)

OTHER PUBLICATIONS

Tozal, et al., "Subnet Level Network Topology Mapping", 30th IEEE International Performance Computing and Communications Conference, IEEE:Orlando, Nov. 17-19, 2011 accessed from <<https://ieeexplore.ieee.org/document/6108072/>> on Aug. 19, 2018. (Year: 2011).*

(Continued)

*Primary Examiner* — Kenneth M Lo
*Assistant Examiner* — Michael J Huntley
(74) *Attorney, Agent, or Firm* — Haynes and Boone, LLP

(57) ABSTRACT

A system and method for switch management includes a switch including a plurality of switch modules, and a status display panel. The plurality of switch modules includes one or more power supply modules for providing power to the switch, one or more cooling modules for cooling the switch, and one or more switching modules. The switch is configured to detect the plurality of switch modules, interrogate the detected switch modules, hierarchically organize status information based on information associated with the interrogated switch modules, and display the organized status information on the status display panel. The status information is displayed on the status display panel using an interactive status display system. In some examples, the switch further includes a plurality of status indicators, and the switch is further configured to temporarily activate the status indicators in response to active use of the status display system.

20 Claims, 10 Drawing Sheets

(51) Int. Cl.
*H04L 12/24* (2006.01)
*G06F 1/26* (2006.01)

(56) References Cited

U.S. PATENT DOCUMENTS

| | | | | |
|---|---|---|---|---|
| 6,091,731 | A | 7/2000 | Biegaj | 370/218 |
| 6,128,016 | A * | 10/2000 | Coelho | G06F 3/033 |
| | | | | 707/999.102 |
| 6,549,943 | B1 * | 4/2003 | Spring | H04L 41/0213 |
| | | | | 709/201 |
| 6,636,499 | B1 | 10/2003 | Dowling | 370/338 |
| 6,839,747 | B1 | 1/2005 | Blumenau | 709/223 |
| 7,076,696 | B1 | 7/2006 | Stringer | 714/4.11 |
| 7,421,495 | B2 * | 9/2008 | Yang | H04L 43/10 |
| | | | | 707/999.001 |
| 7,430,593 | B2 * | 9/2008 | Baldwin | H04L 67/1097 |
| | | | | 709/223 |
| 7,512,894 | B1 | 3/2009 | Hintermeister | 715/734 |
| 7,515,546 | B2 | 4/2009 | Gaspard | 370/252 |
| 7,640,325 | B1 * | 12/2009 | DeKoning | G06F 3/0605 |
| | | | | 709/201 |
| 7,783,799 | B1 | 8/2010 | Sivertsen | 345/156 |
| 7,805,564 | B2 * | 9/2010 | Matsunami | G06F 3/0611 |
| | | | | 370/244 |
| 7,873,719 | B2 | 1/2011 | Bishop | 709/223 |
| 8,271,626 | B2 * | 9/2012 | Childers | H04L 41/0853 |
| | | | | 709/221 |
| 8,402,079 | B2 | 3/2013 | Stein | 709/200 |
| 8,490,021 | B2 * | 7/2013 | Emard | G06F 17/30994 |
| | | | | 715/738 |
| 8,547,825 | B2 | 10/2013 | Armstrong | 370/215 |
| 8,774,056 | B2 | 7/2014 | Lueckenhoff | 370/255 |
| 8,843,771 | B2 | 9/2014 | Wang | 700/299 |
| 8,848,722 | B2 | 9/2014 | Chapel | 370/220 |
| 8,849,980 | B2 | 9/2014 | Dieberger | 709/223 |
| 8,868,715 | B2 | 10/2014 | Bearden | 709/224 |
| 8,873,425 | B2 | 10/2014 | Adams, III | 358/1.15 |
| 8,954,762 | B2 | 2/2015 | Boss | 320/124 |
| 9,054,989 | B2 | 6/2015 | Anantharam | |
| 9,071,508 | B2 | 6/2015 | Anantharam | |
| 9,202,304 | B1 | 12/2015 | Baenziger | |
| 2002/0004912 | A1 | 1/2002 | Fung | 713/300 |
| 2003/0033466 | A1 * | 2/2003 | Larson | G06F 11/0709 |
| | | | | 710/305 |
| 2003/0112765 | A1 * | 6/2003 | Gaspard | H04L 41/0213 |
| | | | | 370/252 |
| 2003/0130832 | A1 | 7/2003 | Schulter | 703/23 |
| 2003/0137940 | A1 | 7/2003 | Schwartz | 370/235 |
| 2004/0017782 | A1 | 1/2004 | Chen | 370/254 |
| 2004/0130578 | A1 * | 7/2004 | Charney | G06F 3/0482 |
| | | | | 715/810 |
| 2004/0172466 | A1 * | 9/2004 | Douglas | H04L 29/06 |
| | | | | 709/224 |
| 2004/0179092 | A1 | 9/2004 | LaPoint | 348/14.08 |
| 2005/0010695 | A1 | 1/2005 | Coward | 709/253 |
| 2005/0027751 | A1 | 2/2005 | Davies | |
| 2005/0041684 | A1 | 2/2005 | Reynolds | 370/463 |
| 2006/0140119 | A1 | 6/2006 | Yeh | 370/235 |
| 2006/0220533 | A1 * | 10/2006 | Achiwa | H04L 41/12 |
| | | | | 313/504 |
| 2007/0165618 | A1 | 7/2007 | Niazi | 370/360 |
| 2007/0206630 | A1 | 9/2007 | Bird | 370/465 |
| 2007/0211712 | A1 | 9/2007 | Fitch | 370/388 |
| 2009/0132928 | A1 * | 5/2009 | Ramachandran | H04L 41/12 |
| | | | | 715/736 |
| 2009/0216920 | A1 | 8/2009 | Lauterbach | 710/36 |
| 2010/0110632 | A1 | 5/2010 | Rose | 361/695 |
| 2010/0215049 | A1 | 8/2010 | Raza | 370/401 |
| 2011/0019585 | A1 | 1/2011 | Diab | 370/254 |
| 2011/0078346 | A1 | 3/2011 | O'Connor | 710/63 |
| 2011/0093815 | A1 * | 4/2011 | Gobeil | G06F 3/0482 |
| | | | | 715/825 |
| 2012/0136498 | A1 | 5/2012 | Chen | 700/297 |
| 2013/0010639 | A1 * | 1/2013 | Armstrong | H04L 41/24 |
| | | | | 370/254 |
| 2013/0013956 | A1 | 1/2013 | Armstrong | 714/4.12 |
| 2013/0077621 | A1 | 3/2013 | Jacob Da Silva | 370/355 |
| 2013/0148511 | A1 * | 6/2013 | Banga | H04L 41/082 |
| | | | | 370/250 |
| 2014/0022912 | A1 | 1/2014 | Kim | 370/244 |
| 2014/0095980 | A1 * | 4/2014 | Tsao | H04L 41/0253 |
| | | | | 715/234 |
| 2014/0258744 | A1 * | 9/2014 | Meyer | G06F 1/3203 |
| | | | | 713/320 |
| 2014/0359044 | A1 | 12/2014 | Davis | 709/213 |

OTHER PUBLICATIONS

Cisco, "Managing Cisco Catalyst Modular Switches Using CiscoWorks LMS", White Paper published by Cisco, 2008, accessed from <<http://www.cisco.com/c/en/us/products/collateral/cloud-systems-management/ciscoworks-lan-management-solution-3-2-earlier/white_paper_c11-494607.pdf>> on May 25, 2016.

Altusen, "KL 1508 IKL1516 User Manual", ATEN International, Jan. 21, 2011, pp. 1, 2, 7-13 (accessed from <<http://www.aten-usa.com/doc_data/manual/20110525175126001.pdf>> on Feb. 8, 2016).

* cited by examiner

SYSTEM AND METHOD FOR SWITCH MANAGEMENT

CROSS-REFERENCED APPLICATIONS

The present application is a continuation of U.S. patent application Ser. No. 13/917,553 filed on Jun. 13, 2013, which is incorporated by reference in its entirety.

BACKGROUND

The present disclosure relates generally to information handling systems, and more particularly to switch management. But it would be recognized that the invention has a much broader range of applicability.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling all types of communication and information. Making all of this possible is a vast array of network switching products that make forwarding decisions in order to deliver packets of information from a source system or first network node to a destination system or second network node. Due to the size, complexity, and dynamic nature of these networks, sophisticated network switching products are often used to implement the interconnection fabric.

In order to provide improved flexibility between users with different needs, network switching products are often designed for scalability. In some examples, the network switching products may be based around a flexible chassis-based system. In some examples, the flexible chassis-based system includes a chassis with one or more slots for accepting modules. In some examples, the modules may include power supplies. In some examples, the modules may include fan trays. In some examples, the modules may include switching modules. Monitoring and/or managing the chassis-based system with the various modules may include multiple complex tasks. As the number and/or type of modules becomes more varied, the complexity of the monitoring and/or management tasks may increase in complexity.

Accordingly, it would be desirable to provide an improved switch design that provides improved support for monitoring and/or managing the switch.

SUMMARY

According to one embodiment, a switch includes a plurality of switch modules, and a status display panel. The plurality of switch modules includes one or more power supply modules for providing power to the switch, one or more cooling modules for cooling the switch, and one or more switching modules. The switch is configured to detect the plurality of switch modules, interrogate the detected switch modules, hierarchically organize status information based on information associated with the interrogated switch modules, and display the organized status information on the status display panel. The status information is displayed on the status display panel using an interactive status display system.

According to another embodiment, a method for managing a switch includes detecting a plurality of switch modules, interrogating the detected switch modules, hierarchically organizing status information based on information associated with the interrogated switch modules, and displaying the organized status information on a status display panel using an interactive status display system. The plurality of switch modules includes one or more power supply modules for providing power to the switch, one or more cooling modules for cooling the switch, and one or more switching modules According to yet another embodiment, an information handling system includes a switch, a plurality of status indicators, and a status display panel. The switch is configured to receive a plurality of switch modules including one or more power supply modules for providing power to the switch, one or more cooling modules for cooling the switch, and one or more switching modules. The switch is configured to detect the plurality of switch modules, interrogate the detected switch modules, hierarchically organize status information based on information associated with the interrogated switch modules, detect addition and removal of switch modules during switch operation, update the status information based on information associated with the added or removed switch modules, display the organized status information on the status display panel using an interactive status display system; and temporarily activate the status indicators in response to active use of the status display system. The status display panel is positioned on the switch so as to not reduce a total number of network ports supported by the one or more switching modules.

In the figures, elements having the same designations have the same or similar functions.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
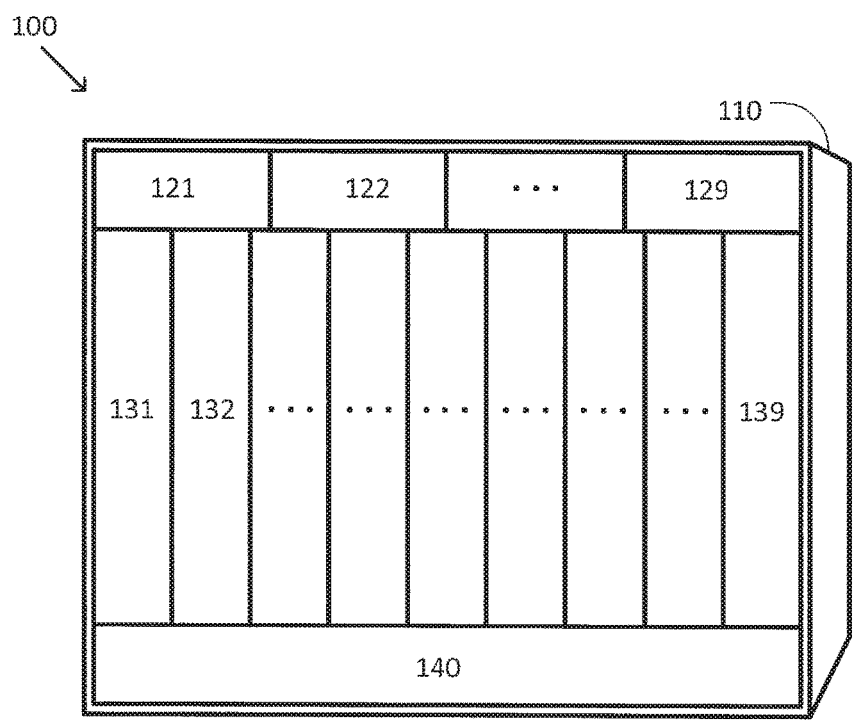
FIG. 1 shows a simplified front view diagram of a chassis according to some embodiments.

FIG. 1 shows a simplified front view diagram of a chassis 100 according to some embodiments. As shown in FIG. 1, chassis 100 is configured around a box-like frame 110, sometimes called the hem. Frame 110 is configured with slots to receive various types of modules depending upon the desired configuration and function of the modules inserted into chassis 100. Although chassis 100 is depicted with slots on the front of chassis 100, as is discussed further below, one of ordinary skill in the art would understand that chassis 100 may further include slots for installing modules on the rear and/or some other side of chassis 100. In some examples, the modules may include plug-and-play style modules. In some examples, the plug-and-play style modules may support hot swapping allowing the plug-and-play style modules to be safely inserted, removed, and/or replaced during operation of chassis 100. In some examples, chassis 100 may be used to house a network switching device or switch. In some examples, chassis 100 may include one or more interconnection mechanisms (not shown). In some examples, the one or more interconnection mechanisms may include a back plane. In some examples, the one or more interconnection mechanisms may include a mid-plane.

Chassis 100 includes one or more power supply slots 121-129 for accepting one or more power supply modules. Although only four power supply slots 121-129 are shown in FIG. 1, one of ordinary skill in the art would understand that any number of power supply slots may be included in the one or more power supply slots 121-129. In some examples, any number of the one or more power supply slots may be used depending upon power requirements of other modules to be inserted into chassis 100. In some examples, each of the one or more power supply modules may be of different types and/or provide different voltage and current levels. In some examples, the one or more power supply modules may be plug-and-play style power supply modules.

Chassis 100 further includes one or more switching module slots 131-139 for accepting one or more switching modules. Although only nine switching module slots 131-139 are shown in FIG. 1, one of ordinary skill in the art would understand that any number of switching module slots may be included in the one or more switching module slots 131-139. A number and/or a type of switching modules that may be inserted in the one or more switching module slots 131-139 may be quite varied. In some examples, the one or more switching modules slots 131-139 may receive one or more route processing modules (RPMs). In some examples, the one or more switching modules slots 131-139 may receive one or more line cards. In some examples, the one or more switching modules slots 131-139 may receive one or more switching fabric modules (SFMs). In some examples, the one or more switching modules slots 131-139 may receive one or more uplink modules. In some examples, the one or more switching modules may be plug-and-play style switching modules. In some examples, the one or more switching modules slots 131-139 may also be configured to receive one or more power supply modules and/or one or more cooling modules.

Chassis 100 further includes one or more cooling module slots 140 for accepting one or more cooling modules. Although only one cooling slot 140 is shown in FIG. 1, one of ordinary skill in the art would understand that any number of cooling module slots may be included in the one or more cooling module slots 140. In some examples, any number of the one or more cooling module slots may be used depending upon cooling requirements of the other modules to be inserted into chassis 100. In some examples, each of the one or more cooling modules may be of different types and/or provide different cooling capabilities. In some examples, the one or more cooling modules may include fan trays. In some examples, each of fan trays may include one or more cooling fans. In some examples, the one or more cooling modules may be plug-and-play style cooling modules.

Figure 2A:
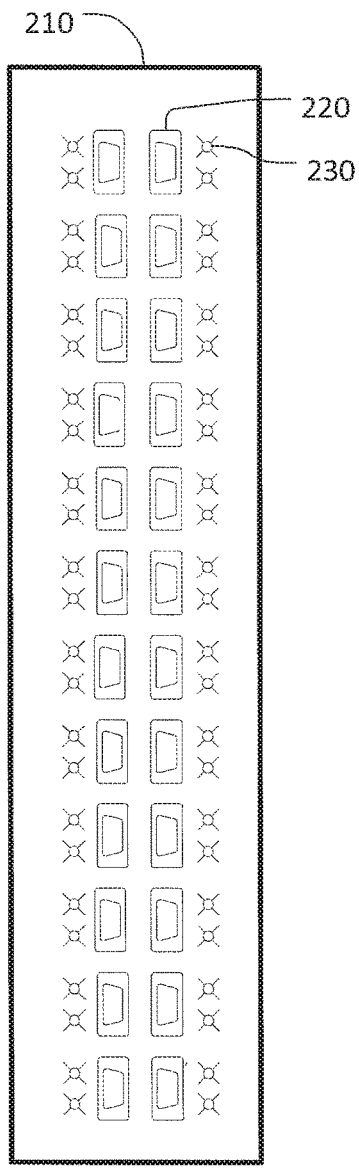
FIGS. 2A and 2B show simplified front view diagrams of switching modules according to some embodiments.

FIG. 2A shows a simplified front view diagram of a switching module 210 according to some embodiments. As shown in FIG. 2A, switching module 210 includes a plurality of ports 220. In some examples, switching module 210 may be installed in any one of the switching module slots 131-139. Each of the ports 220 provides a connection point for coupling switching module 210 to another port in a network using a network link. In some examples, switching module 210 may be a module selected from a group consisting of a line card, an uplink module, a RPM, a SFM, and the like. As also shown in FIG. 2A, each of the ports 220 includes two status indicators 230. In some examples, the status indicators may indicate a status of the respective port 220. In some examples, the status may include an indication of whether an operative network link is coupled to the respective port 220. In some examples, the status may include an indication of whether network traffic is being exchanged using the respective port 220. In some examples, each of the status indicators may be a LED or similar light-emitting device.

In some embodiments, reliance on status indicators 230 to indicate the status of the respective port may be limited. In some examples, when each of the status indicators 230 is either on or off, use of two status indicator may at best indicate four status conditions. In some examples, when the status indicators 230 also support multiple colors (e.g., a multi-color LED) and/or flashing, a number of status conditions may be increased, but may additionally result in less easily interpreted status conditions. In some examples, there may not be sufficient space on switching module 210 around the plurality of ports 220 to document the various status conditions. In some examples, as the number of conditions increases, more complex documentation and/or more sophisticated operators are required. In some examples, this may be compounded by dozens or even hundreds or more status indicators 230 for a fully populated switch.

In some embodiments, status indicators 230 may not always be visible to an operator of the switch. In some examples, switching module 210 may be installed in a rear-side of a chassis. In some examples, an operator located on a front-side of the chassis may not have visual access to see the status indicators 230 of switching module 210 when it is installed on the rear-side of the chassis. In some examples, the opposite may occur when the operator is to the rear-side of the chassis and switching module 210 is installed on the front-side of the chassis.

In some embodiments, use of large numbers of status indicators 230 may add significant cost to the operation of the switch. In some examples, when the switch includes 100s of ports, the status indicators 230 may consume 40, 50, or even more Watts of power. Over an expected service lifetime for the switch, this may result in power consumption of 1000s of kilowatts. In some examples, the power consumed by the status indicators 230 may require larger power supply modules for the switch. In some examples, the power consumed by the status indicators 230 may require larger cooling modules for the switch. In some examples, one or more of these factors may add to a life-time cost of operating switch.

Figure 2B:
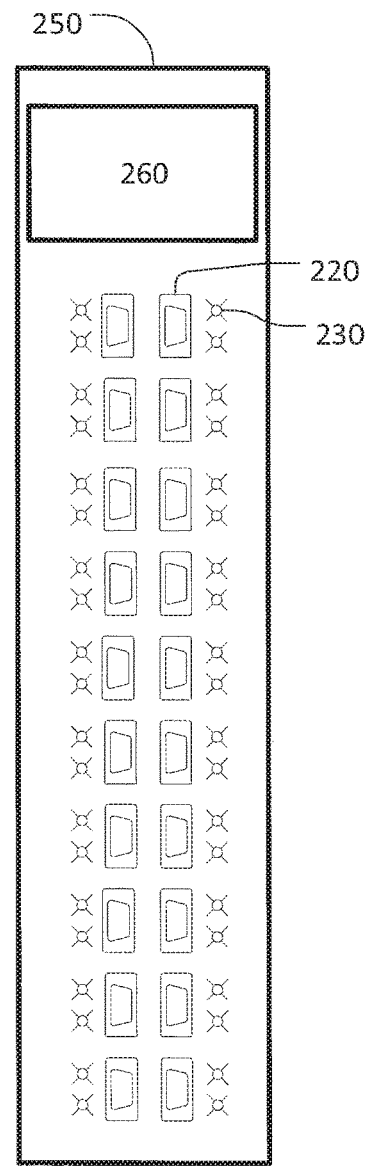

FIG. 2B shows a simplified front view diagram of a switching module 250 according to some embodiments. As shown in FIG. 2B, switching module 250 includes a plurality of ports 220. In some examples, switching module 250 may be installed in any one of the switching module slots 131-139. Each of the ports 220 provides a connection point for coupling switching module 250 to another port in a network using a network link. In some examples, switching module 250 may be a module selected from a group consisting of a line card, an uplink module, a RPM, a SFM, and the like. As also shown in FIG. 2B, each of the ports 220 includes two status indicators 230. In some examples, the status indicators may indicate a status of the respective port 220.

Switching module 250 may further include a status display panel 260. In some examples, status display panel 260 may provide a more intuitive and/or user-friendly interface for displaying status of the switch to the operator. In some examples, status display panel 260 may have low power consumption. In some examples, status display panel 260 may be a LCD panel. In some examples, status display panel 260 may be a multi-line LCD panel. In some examples, status display panel 260 may be a dot-matrix LCD panel. In some examples, status display panel 260 may be a color display. In some examples, status display panel 260 may be touch-sensitive.

In some embodiments, when status display panel 260 is used in the switch, status indicators 230 may be partially and/or fully disabled. In some examples, status indicators 230 may be disabled unless activated using status display panel 260. In some examples, partially and/or fully disabling status indicators 230 may decrease power consumption and/or reduce cooling needs of the switch.

In some examples, status display panel 260 may reduce a number of ports 220 included in switching module 250. In some examples, to avoid reducing the number of ports 220, status display panel 260 may be included in only some of the switching modules installed in the switch. In some examples, only one status display panel 260 may be included with the switch. In some examples, status display panel 260 may be included in switching modules where the number of ports 220 is not reduced. In some examples, status display panel 260 may be included in RPMs. In some examples, status display panel 260 may be included in cooling modules. In some examples, status display panel 260 may be controlled by one or more processors of switching module 250. In some examples, status display panel 260 may be controlled by one or more processors of an RPM separate from switching module 250.

Figure 3A:
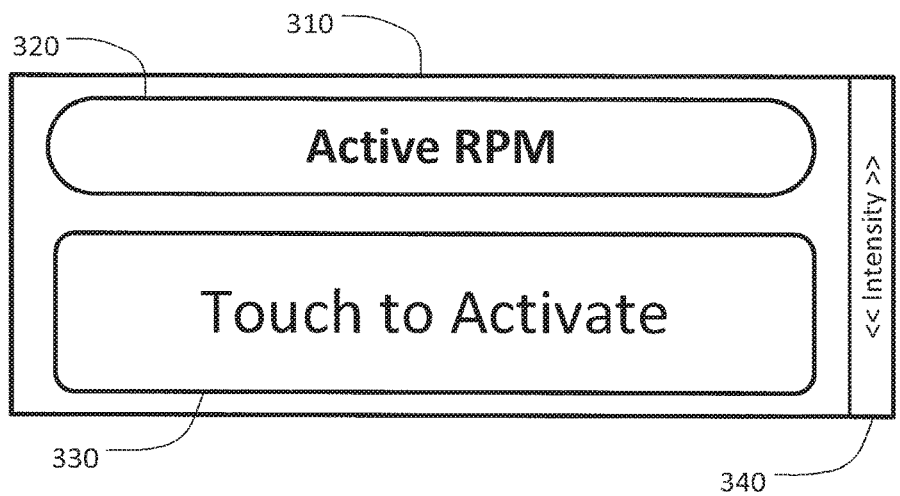
FIGS. 3A and 3B show simplified diagrams of status displays according to some embodiments.

FIG. 3A shows a simplified diagram of a status display 310 according to some embodiments. As shown in FIG. 3A, status display 310 includes various forms of indicia designed to convey status information regarding a switch such as a chassis-based switch. In some examples, status display 310 may be displayed on status display panel 260. Status display 310 includes a label 320 indicating that status display 310 is associated with an active RPM of the switch. In some examples, the active RPM of the switch may be a master RPM for the switch. In some examples, status display 310 may be a home screen for a status display system. In some examples, the status display system may be organized hierarchically.

Status display 310 also includes a button 330 for further activating the status display system. In some examples, button 330 may temporarily activate one or more status indicators of the switch. In some examples, the one or more status indicators may be status indicators 230. In some examples, activating button 330 may activate the one or more status indictors for a specified duration. In some examples, the specified duration may be one minute. In some examples, the specified duration may be five minutes. In some examples, the specified duration may be configured using the status display system. In some examples, the specified duration may be restarted any time any button on status display 310 is activated.

In some examples, status display 310 may further include an intensity control 340. In some examples, intensity control 340 may be used to increase and/or decrease a brightness and/or a contrast of status display 310. In some examples, intensity control 340 may be used to adapt to ambient light levels. In some examples, activating an upper end of intensity control 340 may increase the brightness of status display 310. In some examples, activating a lower end of intensity control 340 may decrease the brightness of status display 310.

Figure 3B:
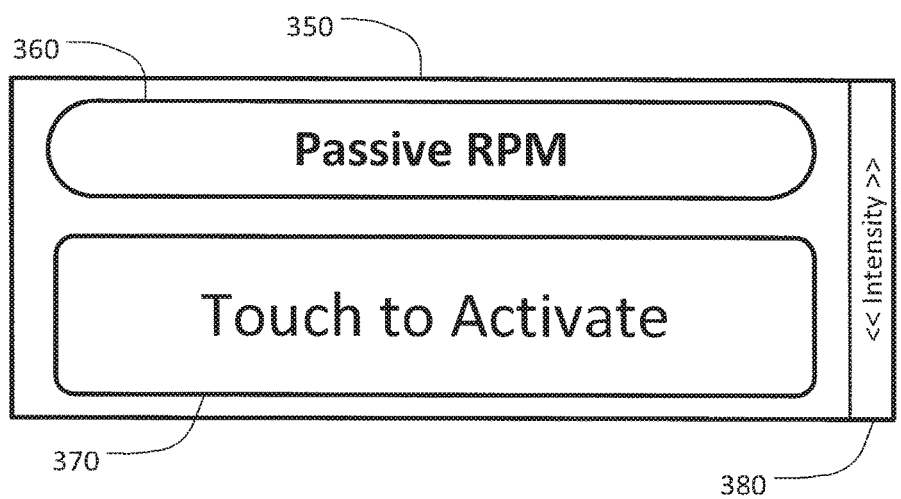

FIG. 3B shows a simplified diagram of a status display 350 according to some embodiments. As shown in FIG. 3B, status display 350 includes various forms of indicia designed to convey status information regarding the switch. In some examples, status display 350 may be displayed on status display panel 260. Status display 350 includes a label 360 indicating that status display 350 is associated with a passive RPM of the switch. In some examples, status display 350 may be a home screen for the status display system. Status display 350 further includes a button 370 for further activating the status display system. In some examples, button 370 may operate similarly to button 330. In some examples, status display 350 may further include an intensity control 380. In some examples, intensity control 380 may operate similarly to intensity control 340.

Figure 4A:
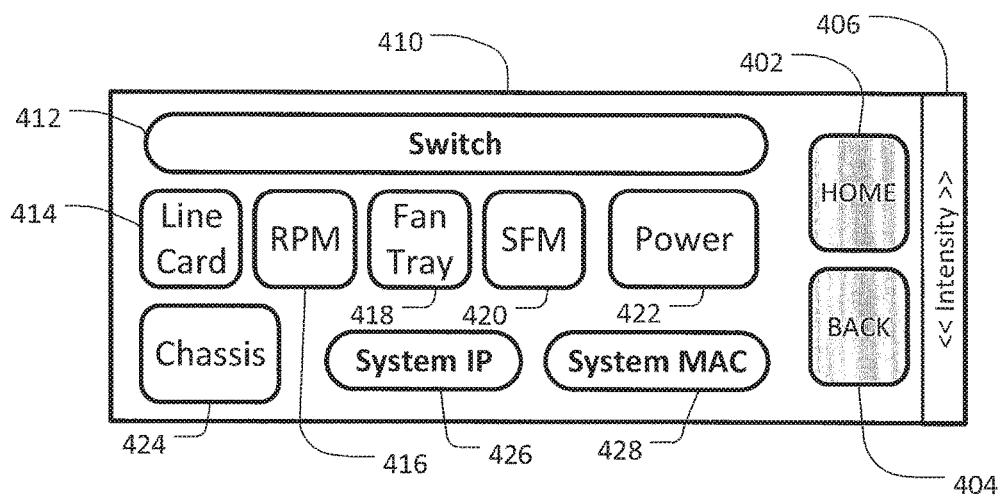
FIGS. 4A-4D show simplified diagrams of status displays according to some embodiments.

FIG. 4A shows a simplified diagram of a switch status display 410 according to some embodiments. As shown in FIG. 4A, switch status display 410 includes various forms of indicia designed to convey status information regarding a chassis (e.g., chassis 100). In some examples, switch status display 410 may be displayed on status display panel 260. In some examples, switch status display 410 may be displayed in response to activating button 330 and/or 370. Switch status display 410 includes a label 412 indicating that switch status display 410 is displaying status information associated with the switch.

Switch status display 410 includes one or more navigation buttons. The one or more navigation buttons may include a Home button 402. Home button 402 may be used to return to a home screen such as status display 310 and/or 350. In some examples, upon returning to the home screen, the one or more status indicators may be disabled. In some examples, return to the home screen may occur after a specified period of non-use of the status display system. In some examples, the specified duration may be one minute. In some examples, the specified duration may be five minutes. In some examples, the specified duration may be configured using the status display system. In some examples, the specified duration may be restarted any time any button on switch status display 410 and/or any other status display of the status display system is operated. The one or more navigation buttons may further include a Back button 404. Back button 404 may be used to return to a previously viewed status display of the status display system. Switch status display 410 may further include an intensity control 406. In some examples, intensity control 406 may operate similarly to intensity control 340 and/or 380.

Switch status display 410 may further include one or more buttons for accessing other levels in a hierarchy of the status display system. A Line Card button 414 may be used to access further information on any line cards installed in the switch. A RPM button 416 may be used to access further information on any RPMs installed in the switch. A Fan Tray button 418 may be used to access further information on any fan trays and/or cooling modules installed in the switch. A SFM button 420 may be used to access further information on any SFMs installed in the switch. A Power button 422 may be used to access further information on any power supply modules installed in the switch. A Chassis button 424 may be used to access further information on a chassis housing the switch.

Switch status display 410 may further include one or more labels for displaying further status indications. A System IP label 426 may be used to display a layer 3 and/or IP address for the switch. A System MAC label 428 may be used to display a layer 2 and/or media access control (MAC) address for the switch.

Figure 4B:
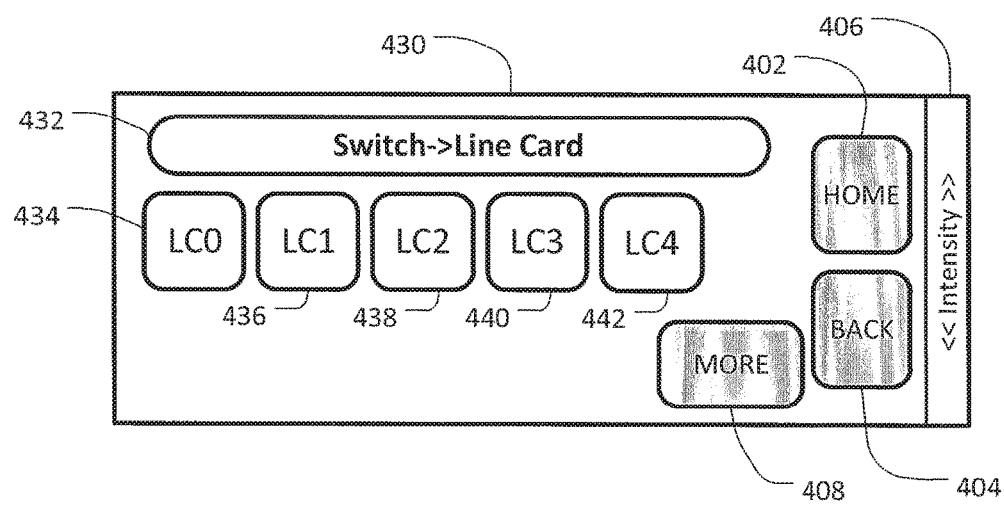

FIG. 4B shows a simplified diagram of a line cards status display 430 according to some embodiments. As shown in FIG. 4B, line cards status display 430 includes various forms of indicia designed to convey status information regarding line cards installed in the switch. In some examples, line cards status display 430 may be displayed on status display panel 260. In some examples, line cards status display 430 may be displayed in response to activating Line Card button 414 on switch status display 410. Line cards status display 430 includes a label 432 indicating that line cards status display 430 is displaying status information associated any line cards installed in the switch.

Line cards status display 430 includes one or more navigation buttons. The one or more navigation buttons may include the Home button 402 and/or the Back button 404. The one or more navigation buttons may further include a More button 408. More button 408 may be used to access more status information than may currently be displayed on the line cards status display 430. In some examples, the more status information may include additional buttons and/or labels to access additional features of the status display system associated with line cards. Line cards status display 430 may further include the intensity control 406.

Line cards status display 430 may further include one or more buttons for accessing other levels in the hierarchy of the status display system. A LC0 button 434 may be used to access further information on line card 0 installed in the switch. A LC1 button 434 through a LC4 button 442 may be used to access further information on line cards 1 through 4 respectively. In some examples, when more than five line cards are installed in the switch, More button 408 may be used to access additional LC* buttons for those additional line cards.

Figure 4C:
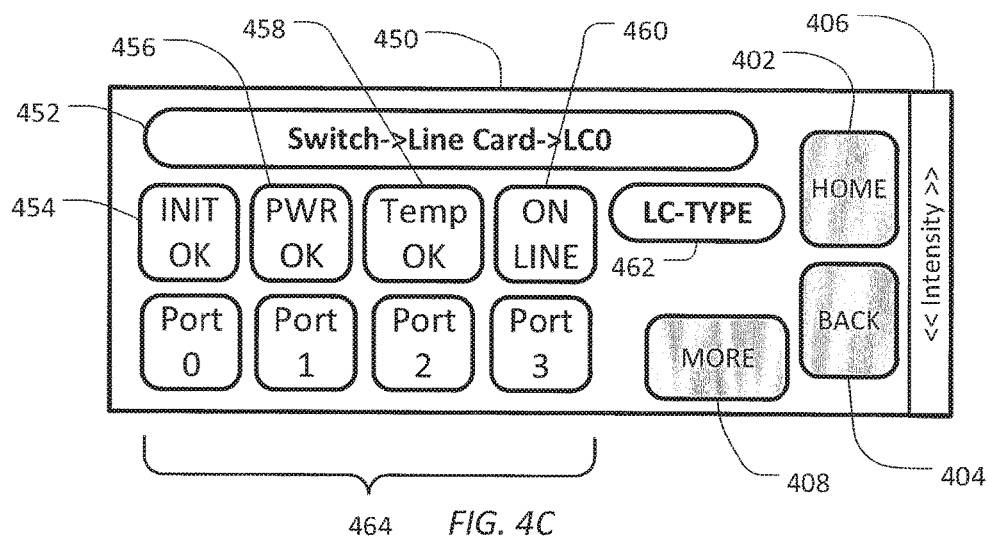

FIG. 4C shows a simplified diagram of a line card status display 450 according to some embodiments. As shown in FIG. 4C, line card status display 450 includes various forms of indicia designed to convey status information regarding a line card (e.g., line card 0). In some examples, line card status display 450 may be displayed on status display panel 260. In some examples, line card status display 450 may be displayed in response to activating LC0 button 434 on line cards status display 430. Line card status display 450 includes a label 452 indicating that line card status display 450 is displaying status information associated with line card 0.

Line card status display 450 includes one or more navigation buttons. The one or more navigation buttons may include the Home button 402, the Back button 404, and/or the More button 408. Line card status display 450 may further include the intensity control 406.

Line card status display 450 may further include one or more buttons for accessing other levels in the hierarchy of the status display system. An INIT OK button 454 may be used to indicate a status of initialization of line card 0 and/or retrieve additional status information associated with the initialization of line card 0. A PWR OK button 456 may be used to indicate a power status and/or retrieve additional status information associated with the power of line card 0. A Temp OK button 458 may be used to indicate a temperature and/or retrieve additional status information associated with the temperature of line card 0. An ON LINE button 460 may be used to indicate an on line status and/or retrieve additional status information associated with the on line state of line card 0. One or more port buttons 464 may be used to retrieve status information associated with the various ports of line card 0.

Line card status display 450 may further include one or more labels for displaying further status indications. As an example, a LC-TYPE label 426 may be used to display a type of line card 0.

Figure 4D:
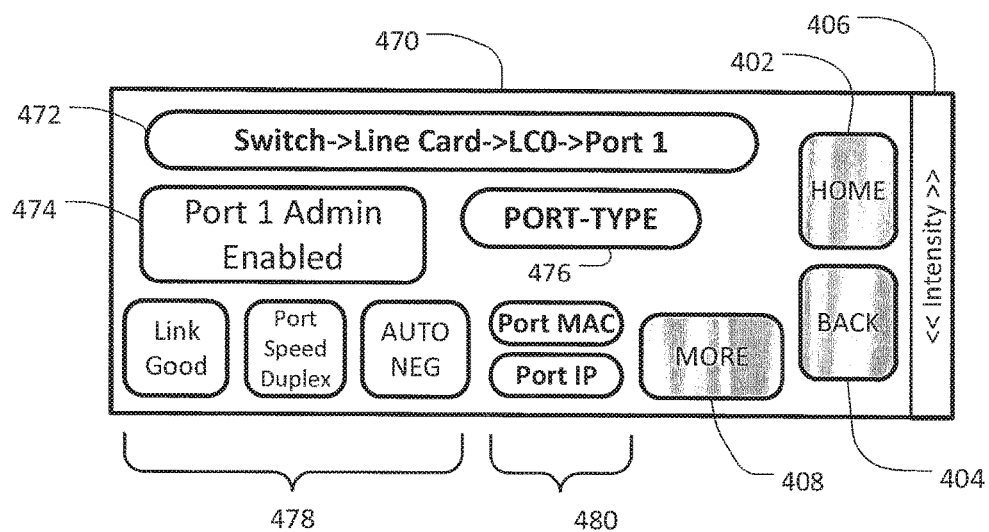

FIG. 4D shows a simplified diagram of a port status display 470 according to some embodiments. As shown in FIG. 4D, port status display 470 includes various forms of indicia designed to convey status information regarding a port (e.g., port 1 of line card 0). In some examples, port status display 470 may be displayed on status display panel 260. In some examples, port status display 470 may be displayed in response to activating a Port 1button included in the one or more port buttons 478 on line card status display 450. Port status display 470 includes a label 472 indicating that port status display 470 is displaying status information associated with port 1 of line card 0.

Port status display 470 includes one or more navigation buttons. The one or more navigation buttons may include the Home button 402, the Back button 404, and/or the More button 408. Port status display 470 may further include the intensity control 406.

Port status display 470 may further include one or more buttons for accessing other levels in the hierarchy of the status display system. A Port 1 Admin Enabled OK button 474 may be used to indicate a status of administration of port 1 of line card 0 and/or retrieve additional status information associated with the administration of port 1 of line card 0. One or more additional port status buttons 478 may be used to indicate and/or retrieve additional status information associated with the link, port speed, and/or auto-negotiation of port 1 of line card 0. Port status display 470 may further include one or more labels for displaying further status indications. As an example, a PORT-TYPE label 476 may be used to display a type of port 1 of line card 0. One or more additional port status labels 480 may be used to display address (e.g., an IP address and/or a MAC address) and/or other status information associated with port 1 of line card 0.

Figure 5A:
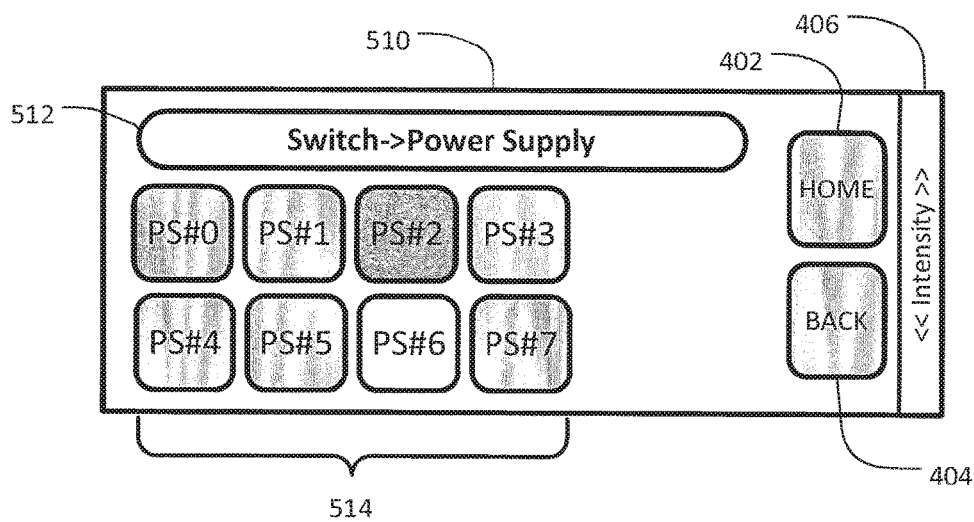
FIGS. 5A and 5B show simplified diagrams of status displays according to some embodiments.

FIG. 5A shows a simplified diagram of a power supplies status display 510 according to some embodiments. As shown in FIG. 5A, power supplies status display 510 includes various forms of indicia designed to convey status information regarding power supplies installed in the switch. In some examples, power supplies status display 510 may be displayed on status display panel 260. In some examples, power supplies status display 510 may be displayed in response to activating Power button 422 on switch status display 410. Power supplies status display 510 includes a label 512 indicating that power supplies status display 510 is displaying status information associated with the power supplies installed on the switch.

Power supplies status display 510 includes one or more navigation buttons. The one or more navigation buttons may include the Home button 402 and/or the Back button 404. Power supplies status display 510 may further include the intensity control 406. Power supplies status display 510 may further include one or more power supply selection buttons 514 for accessing additional status information on each of the power supplies installed in the switch.

Power supplies status display 510 further demonstrates use of visual queuing to display status information associated with each of the power supplies. As shown by the visual queuing in FIG. 5A, power supplies #0, 1, 4, 5, and 7 are functioning normally, power supplies #3 and 6 are not installed, and power supply #2 is in a warning or an error state. In some examples, the visual queuing may include different intensities and/or brightnesses of the respective power supply selection buttons 514. In some examples a lighter power supply selection button may indicate that a respective power supply is not installed. In some examples, a darker power supply selection button may indicate that a respective power supply is in a warning or an error state. In some examples, patterning may be used instead of and/or in addition to intensity. In some examples, the visual queuing may include use of color. In some examples, green may indicate an installed and functioning power supply, white an uninstalled power supply, and yellow and/or red may indicate a warning or an error state. In some examples, the visual queuing may include use of flashing. In some examples, the visual queuing may include use of a change in an outer border of the respective button.

Figure 5B:
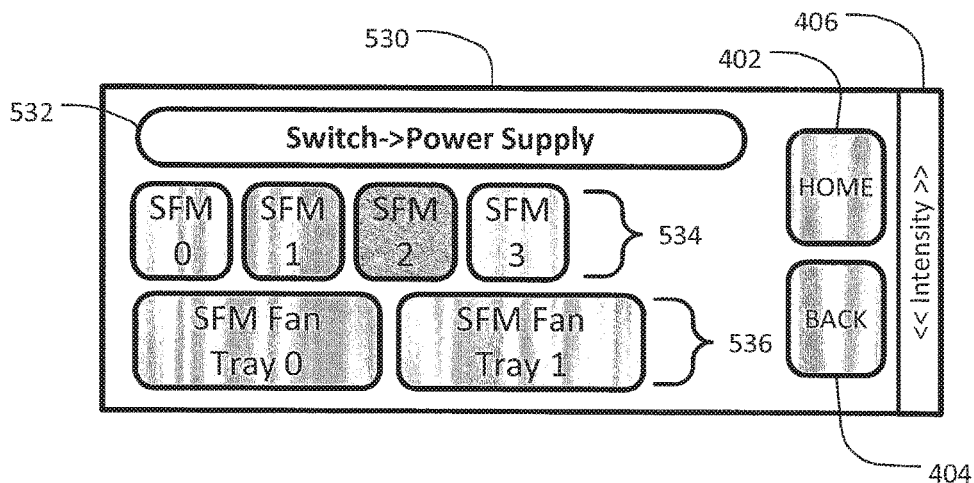

FIG. 5B shows a simplified diagram of a SFMs status display 530 according to some embodiments. As shown in FIG. 5B, SFMs status display 530 includes various forms of indicia designed to convey status information regarding SFMs installed in the switch. In some examples, SFMs status display 530 may be displayed on status display panel 260. In some examples, SFMs status display 530 may be displayed in response to activating SFM button 420 on switch status display 410. SFMs status display 530 includes a label 532 indicating that SFMs status display 530 is displaying status information associated with the SFMs installed on the switch.

SFMs status display 530 includes one or more navigation buttons. The one or more navigation buttons may include the Home button 402 and/or the Back button 404. SFMs status display 530 may further include the intensity control 406. SFMs status display 530 may further include one or more SFM selection buttons 534 for accessing additional status information on each of the SFMs installed in the switch. SFMs status display 530 may further include one or more SFM Fan Tray selection buttons 536 for accessing additional status information on each of the SFM fan trays installed in the switch.

SFMs status display 530 further demonstrates use of visual queuing, similar to that used in power supplies status display 510, to display status information associated with each of the SFMs and SFM fan trays. As shown by the visual queuing in FIG. 5B, SFM 0, SFM 1, SFM fan tray 0, and SFM fan tray 1 are functioning normally, SFM3 is not installed, and SFM 2 is in a warning or an error state.

Figure 6A:
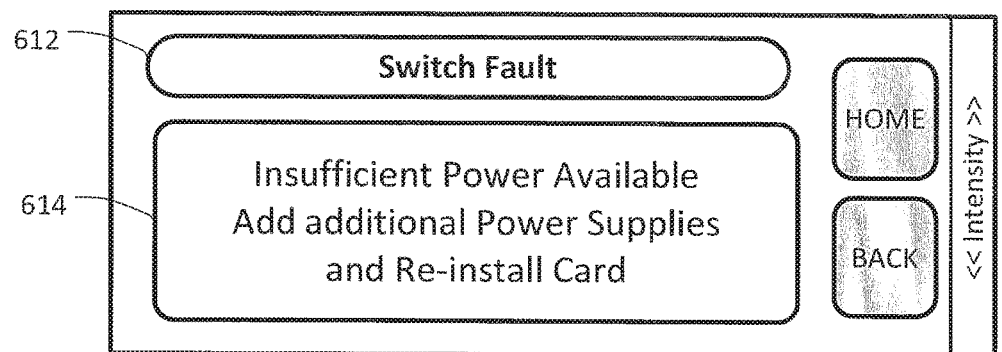
FIGS. 6A-6C show simplified diagrams of status message displays according to some embodiments.
Figure 6B:
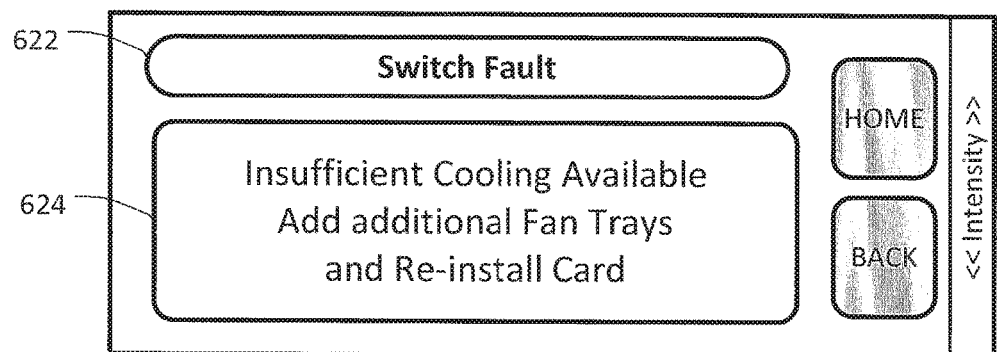
Figure 6C:
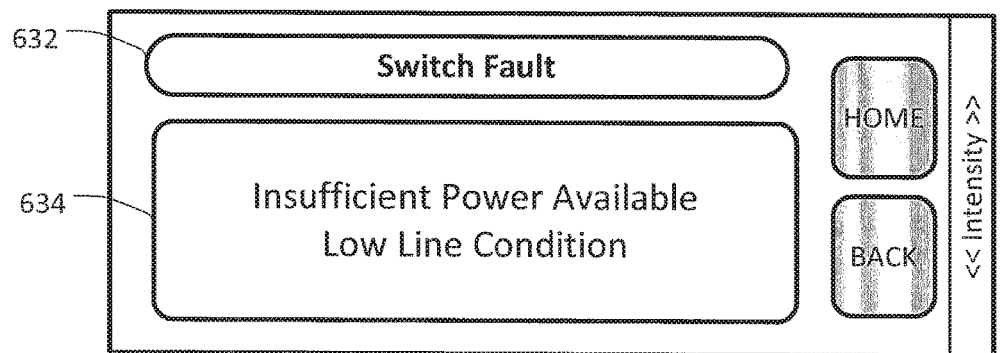

FIGS. 6A-6C show simplified diagrams of status message displays according to some embodiments. As shown in FIG. 6A, a status message display 610 may be used to display a switch fault. In some examples, status message display 610 may be displayed on status display panel 260. Status message display 610 includes a switch fault label 612 and an insufficient power available button 614. In some examples, status message display 610 and insufficient power available button 614 may be displayed in response to installation of a new module in the switch. In some examples, upon installation of the new module in the switch, the installed power supply modules may no longer be able to supply enough power for the new module. In some examples, the new module may be a switching module and/or a cooling module. In some examples, insufficient power available button 614 may be activated to display more information associated with the insufficient power available fault.

As shown in FIG. 6B, a status message display 620 may be used to display a switch fault. In some examples, status message display 620 may be displayed on status display panel 260. Status message display 620 includes a switch fault label 622 and an insufficient cooling available button 624. In some examples, status message display 620 and insufficient cooling available button 624 may be displayed in response to installation of a new module in the switch. In some examples, upon installation of the new module in the switch, the installed cooling modules may no longer be able to supply enough cooling to adequately cool the new module. In some examples, the new module may be a switching module and/or a power supply module. In some examples, insufficient cooling available button 624 may be activated to display more information associated with the insufficient cooling available fault.

As shown in FIG. 6C, a status message display 630 may be used to display a switch fault. In some examples, status message display 630 may be displayed on status display panel 260. Status message display 630 includes a switch fault label 632 and a low line condition button 634. In some examples, status message display 630 and low line condition button 634 may be displayed in response to a power supply fault. In some examples, low line condition button 634 may be activated to display more information associated with the low line condition fault.

In some embodiments, other status message displays may be used to display other switch faults and/or error and/or warning conditions. In some examples, one of the other status message displays may be used to display an out of range notice, such as an over temperature condition. In some examples, one of the other status message displays may include a notification for loss of communication with one of the installed modules. In some examples, one of the other status message displays may include a notification for a failure in the switch. In some examples, the failure in the switch may include a failure in a port, a failure in a network link, and the like.

Figure 7A:
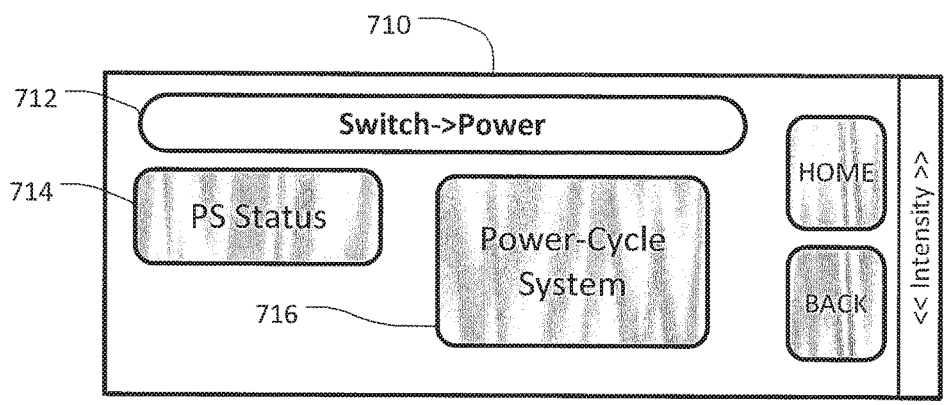
FIGS. 7A-7B show simplified diagrams of status displays supporting control according to some embodiments.
Figure 7B:
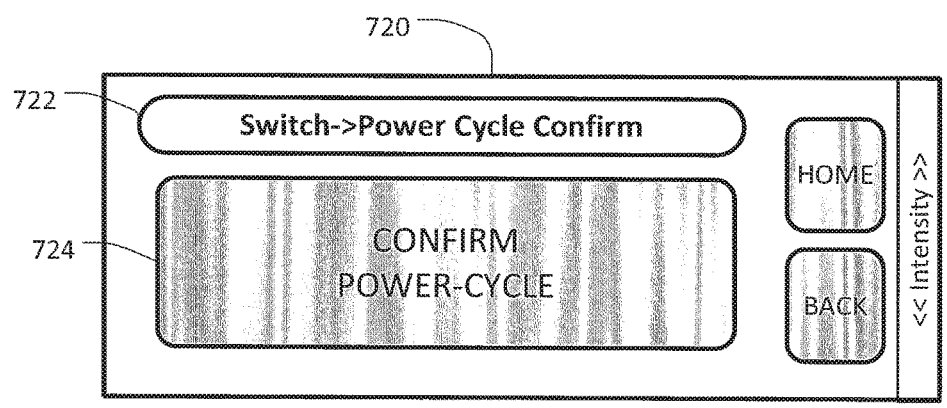

FIGS. 7A-7B show simplified diagrams of status displays supporting control according to some embodiments. As shown in FIG. 7A, a power status display 710 may be used to display power status and/or control power in the switch. In some examples, power status display 710 may be displayed on status display panel 260. Power status display 710 includes a label 712 indicating that power status associated with the switch is being displayed, one or more navigation buttons, and the intensity control. Power status display 710 further includes a power supply status button 714 for accessing additional status information on the power supply. Power status display 710 further includes a power cycle button 716 for initiating a power cycle operation of the power supply.

As shown in FIG. 7B, a power cycle confirm status display 730 may be used to request confirmation of the power cycle request made by activating power cycle button 716. In some examples, power cycle confirm status display 730 may be displayed on status display panel 260. Power cycle confirm status display 730 includes a label 732 indicating that power cycle confirmation is being requested. Power cycle confirm status display 730 further includes a power cycle confirmation button 724 for confirming the power cycle request. Power cycling may be confirmed by activating button 724. In some examples, the status display system may include further safe guards before permitting an operator to initiate a power cycle and/or any other controls present in the status display system.

According to some embodiments, the status display system may be used for more extensive control of the switch. In some examples, the status display system may provide additional status displays for configuring virtually any feature of the switch. In some examples, the status display system may provide an alternative interface to a command line interface and/or some other configuration interface accessed through a computing device and/or a workstation separate from the switch. In some examples, the status display system may include one or more security features and/or security policies to prevent accidental, unwanted, and/or unauthorized changes from being made to the configuration of the switch. In some examples, the status display system may allow changes to the configuration of only some of the features of the switch.

Figure 8:
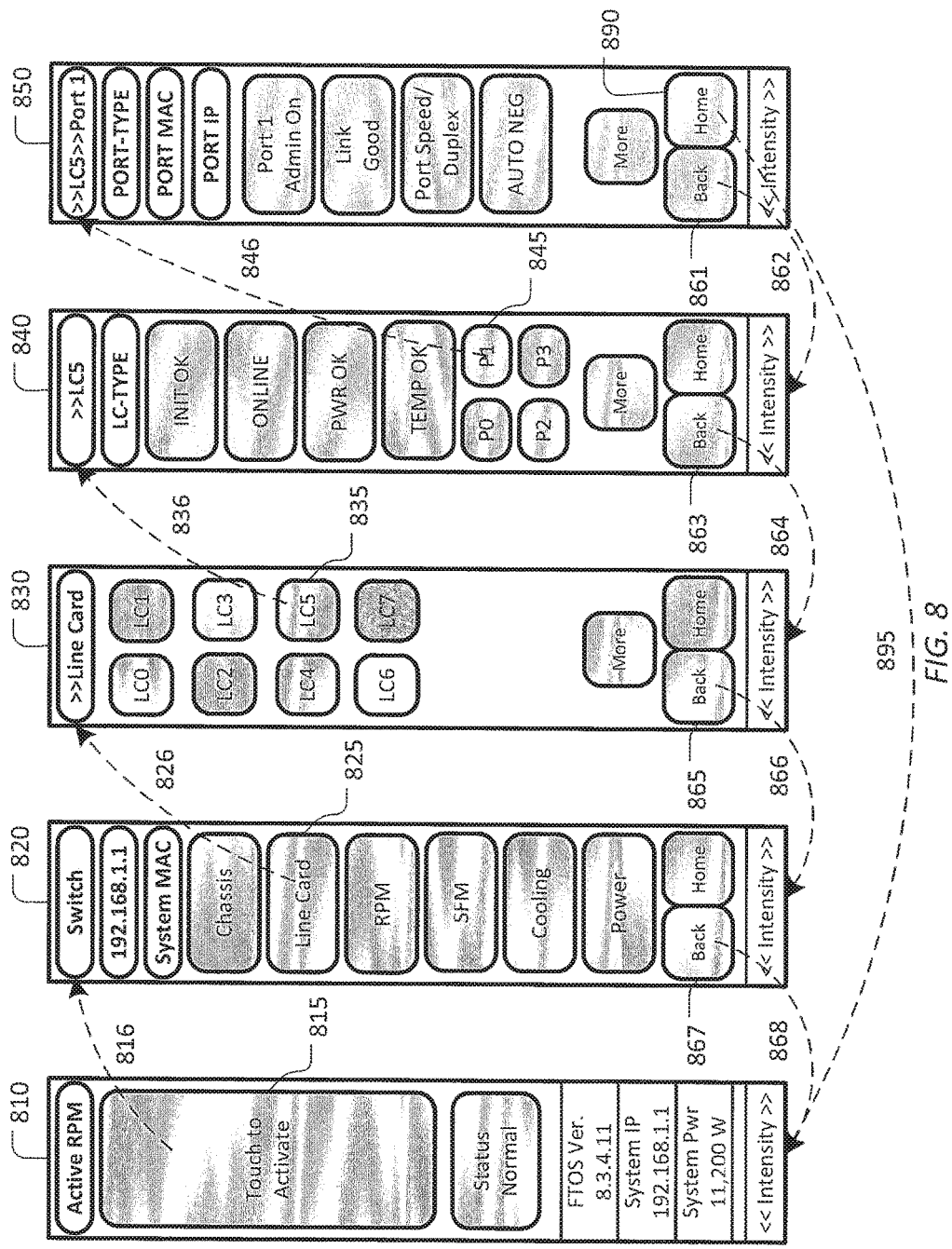
FIG. 8 shows simplified diagrams of a status display hierarchy according to some embodiments.

FIG. 8 shows simplified diagrams of a status display hierarchy according to some embodiments. As shown in FIG. 8, a status display system may include a hierarchy of status displays. The hierarchy of FIG. 8 includes five example status displays including a status display 810, a switch status display 820, a line cards status display 830, a line card status display 840, and a port status display 850. Status displays 810, 820, 830, 840, and 850 roughly correspond to status display 310, switch status display 410, line cards status display 430, line card status display 450, and port status display 470, respectively of FIGS. 3A and 4A-4D, but depict an alternative layout that may be used for status displays 810, 820, 830, 840, and 850 when a taller and narrower status display panel is used in place of status display panel 260.

In some examples, status display 810 may be a home display for the status display system. Status display 810 may provide general status information associated with a switch and may include various labels, buttons, and/or controls. Status display 810 may further include a Touch to Activate button 815. In some examples, Touch to Activate button 815 may be used to temporarily activate one or more status indicators in a fashion similar to button 330. When activated, Touch to Activate button 815 may further result in switch status display 820 being displayed as depicted by a transition arrow 816.

Switch status display 820 may provide status information associated with a switch and may include various labels, buttons, and/or controls. Switch status display 820 may further include a Line Card button 825. When activated, Line Card button 825 may further result in line cards status display 830 being displayed as depicted by a transition arrow 826.

Line cards status display 830 may provide status information associated with any line cards installed in the switch and may include various labels, buttons, and/or controls. Line cards status display 830 may further include a LC5 button 835. When activated, LC5 button 835 may further result in line card status display 840 being displayed as depicted by a transition arrow 836.

Line card status display 840 may provide status information associated with line card 5 and may include various labels, buttons, and/or controls. Line card status display 840 may further include a P1 button 845. When activated, P1 button 845 may further result in port status display 850 being displayed as depicted by a transition arrow 846. Similarly, port status display 850 may provide status information associated with port 1 of line card 5 and may include various labels, buttons, and/or controls.

According to some embodiments, status displays 810, 820, 830, 840, and/or 850 may demonstrate using buttons 815, 825, 835, and/or 845 to move to lower levels of the hierarchy of the status display system. In some examples, transitions arrows 816, 826, 836, and/or 846 may represent possible transitions between displays screens and levels of the hierarchy of the status display system. Status displays 820, 830, 840, and/or 850 may further include navigation buttons for further moving between status displays and/or levels of the hierarchy of the status display system.

A Back button 861 on port status display 850 may be used to return to a previous status display. In some examples, when port status display 850 is reached via transition arrow 846, activation of Back button 861 may result in a return to line card status display 840 as depicted by a transition arrow 862. Similarly Back buttons 863, 865, and 867 may be used to transition to previous status display screens 830, 820, and 810, respectively, as depicted by transition arrows 864, 866, and 868, respectively. In some examples, other status displays (not shown) in the status display system may include similar Back buttons for supporting navigation through the levels of the hierarchy of the status display system.

A Home button 890 on port status display 850 may be used to return to the home screen for the status display system. When activated Home button 890 may return to status display 810 as depicted by a transition arrow 895. In some examples, status displays 820, 830, and/or 840 as well as other status displays (not shown) in the status display system may include similar Home buttons for supporting navigation to the home screen of the status display system. In some examples, activation of any of the Home buttons may disable the one or more status indicators.

As discussed above and further emphasized here, FIGS. 2B-8 are merely examples which should not unduly limit the scope of the claims. One of ordinary skill in the art would recognize many variations, alternatives, and modifications. In some embodiments, different configurations and/or layouts of the various status displays are possible. In some examples, the status display screen may support scrolling, panning, and/or zooming. In some embodiments, the status display system may include one or more user preferences. In some examples, the status display system may support internationalization. In some examples, the status display system may support custom color palettes. In some embodiments, the status display panel 260 may be associated with a user input device for selecting the buttons and/or controls on the status displays. In some examples, the user input device may include a touch screen. In some examples, the user input device may include one or more buttons around a perimeter of the status display panel 260. In some examples, the user input device may include a joy stick, touch pad, and/or other positioning device.

Figure 9:
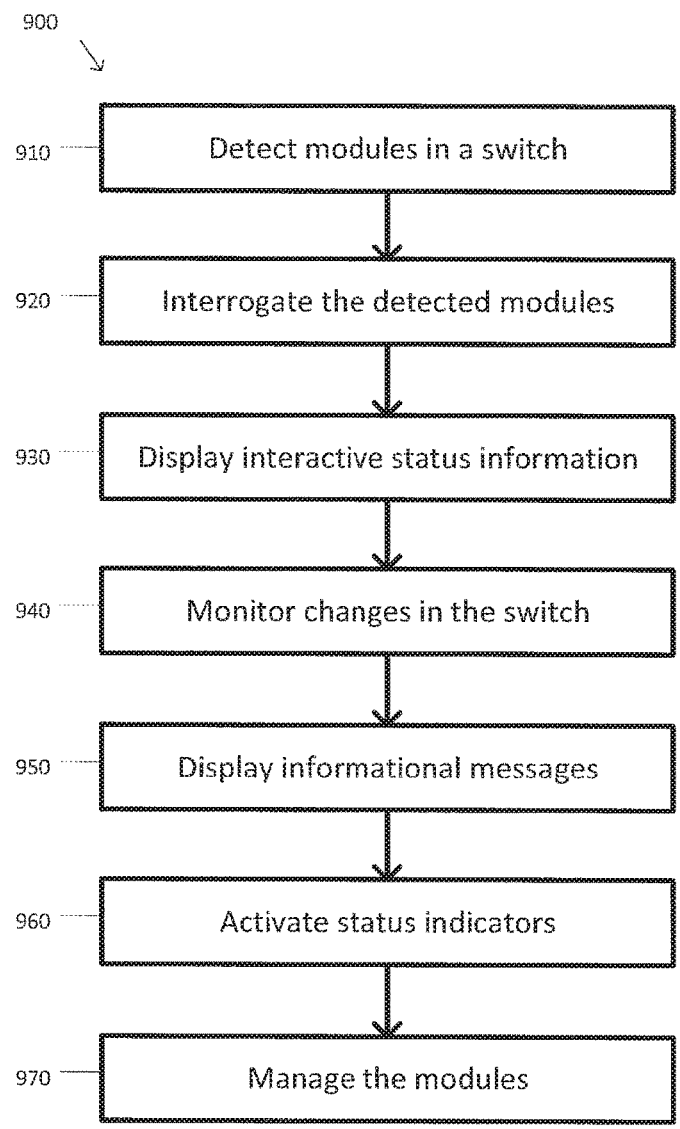
FIG. 9 shows a simplified diagram of a method of managing a switch according to some embodiments.

FIG. 9 shows a simplified diagram of a method 900 of managing a switch according to some embodiments. As shown in FIG. 9, the method 900 includes a process 910 for detecting modules in a switch, a process 920 for interrogating the detected modules, a process 930 for displaying interactive status information, a process 940 for monitoring changes in the switch, a process 950 for displaying informational messages, a process 960 for activating status indicators, and a process 970 for managing the modules. According to certain embodiments, the method 900 of managing a switch can be performed using variations among the processes 910-970 as would be recognized by one of ordinary skill in the art. In some embodiments, one or more of the processes 910-970 may be implemented, at least in part, in the form of executable code stored on non-transient, tangible, machine readable media that when run by one or more processors (e.g., one or more processors of a switch and/or one or more processors of one or more switching modules) may cause the one or more processors to perform one or more of the processes 910-970.

At the process 910, modules in a switch are detected. Before status information associated with the switch may be displayed and/or managed, the status information may be collected from the modules included in the switch. In some examples, the modules may include one or more modules of each of various types. In some examples, the types may include power supply modules, cooling modules, and/or switching modules. In some examples, the switching modules may include line cards, RPMs, SFMs, uplink modules, and/or the like. In some examples, the switch may be a chassis-based switch. In some examples, the modules may be the modules installed in the slots 121-129, 131-139, and/or 140 of chassis 100.

According to some embodiments, the modules may be detected using a switch operating system. In some examples, the switch operating system may be the Force10 Operating System. In some examples, the switch operating system may be executed by one or more processors of the switch. In some examples, the switch operating system may be executed by one or more processors of a RPM installed in the switch. In some examples, the switch may include module detection circuitry, one or more system management buses (SMBs), one or more intelligent platform management interfaces (IPMIs), and/or the like for supporting the detection of the modules. In some examples, process 910 may be initiated by power-up of the switch.

At the process 920, the detected modules are interrogated. In some examples, the switch operating system may interrogate the one or more modules by exchanging one or more messages with each of the detected modules to determine status information associated with each of the detected modules. In some examples, the messages may be exchanged using the one or more SMBs, the one or more IPMIs, and/or the like. In some examples, the switch operating system may receive various kinds of information associated with each module. In some examples, the information associated with each module may include a type, one or more identifiers, one or more module numbers, one or more version numbers, one or more addresses, power requirements, voltage requirements, temperature limits, cooling requirements, and the like. In some examples, when the module is a switching module, the information associated with the switch module may further include a number of ports, port speeds, and/or the like. In some examples, when the module is a power supply module, the information associated with the power supply module may include voltages supplied, currents supplied, and/or the like. In some examples, when the module is a cooling module, the information associated with the cooling module may include a number of fan trays, a number of fans, a cooling capacity, an air flow direction, and/or the like. In some examples, the information associated with each module may be retrieved from memory in each module. In some examples, the memory may include one or more types of storage media commonly used in computing systems including ROM, PROM, EPROM, EEPROM, Flash, RAM, and the like. In some examples, the switch operating system may update the information associated with each module periodically. In some examples, the switch operating system may maintain one or more data structures with the retrieved information.

At the process 930, interactive status information is displayed. Using a status display panel, such as status display panel 260, the switch operating system may display status of the switch based on the information retrieved during process 920. In some examples, the switch operating system may use the status display panel to display one or more status screens for interacting with an operator of the switch. In some examples, the switch operating system may display the status display system described in greater detail in FIGS. 3A-8.

At the process 940, the switch is monitored for changes. In some examples, processes 910 and/or 920 may be performed periodically to obtain updated information about the modules installed in the switch. In some examples, the switch operating system may detect removal of a module. In some examples, the switch operating system may detect installation of a new module. In some examples, monitoring for changes may include using the module detection circuitry, the one or more SMBs, the one or more IPMIs, and/or the like. In some examples, the switch operating system may detect over and/or under voltages, and/or one or more out of range temperatures.

At the process 950, informational messages are displayed. In some examples, one or more conditions in the switch may result in an informational message to be displayed. In some examples, the informational message may preempt use of the interactive use of the status display panel during process 930. In some examples, the informational message may be associated with a warning and/or an error condition that should be displayed. In some examples, the warning and/or the error condition may be a low line condition and result in the message display of FIG. 6C. In some examples, the informational message may be associated with a failure in installing a module. In some examples, the failure may be associated with the insufficient power available and/or the insufficient cooling available message displays of FIGS. 6A and 6B, respectively.

At the process 960, status indicators are activated. In some examples, the switch operating system may temporarily activate the status indicators of one or more modules of the switch. In some examples, the status indicators may be the status indicators 230. In some examples, the status indicators may be activated only during periods when the status display panel is being interactively used. In some examples, the status indicators may be activated as discussed above with respect to FIG. 3B.

At the process 970, the modules are managed. In some examples, the switch operating system may manage the switch and/or the installed modules normally. In some examples, the status display system may be used to solicit control instructions from the operator. In some examples, the control instructions may include a power cycle confirm operation and/or other operations as discussed above with respect to FIGS. 7A and 7B. In some examples, the control instructions may permit more extensive control and/or configuration of the switch and/or the installed modules.

Some embodiments of a switch may include non-transient, tangible, machine readable media that include executable code that when run by one or more processors may cause the one or more processors (e.g., one or more processors of a switch and/or one or more processors of one or more switching modules) to perform the processes of method 900 as described above. Some common forms of machine readable media that may include the processes of method 900 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for managing a switch, the method comprising:
   exchanging, by a first module of the switch, one or more messages with one or more detected modules of the switch to determine status information associated with each of the one or more detected modules, and a type of each of the one or more detected modules, wherein the first module is selected from a group of modules consisting of a switching module, a route processing module (RPM), and a cooling module;
   determining a hierarchy among the one or more detected modules of the switch based on the determined type of each of the modules of the switch;
   organizing the status information associated with each of the one or more detected modules of the switch consistent with the determined hierarchy;
   displaying the organized status information on a status display panel mounted on the first module of the switch on a plurality of status display screens, each of the status display screens displaying information at a corresponding level of the hierarchy and having one or more user interface elements for navigating between a current status display screen at a first level of the hierarchy to one or more of the status display screens at other levels of the hierarchy; and
   managing, by an operator, the switch using the organized status information displayed on the status display panel.

2. The method of claim 1, further comprising detecting a fault in one of the one or more detected modules of the switch, the fault selected from a group consisting of insufficient cooling, insufficient power, loss of communication, and switch failure.

3. The method of claim 2, further comprising detecting insufficient cooling in response to installation of a new module in the switch.

4. The method of claim 1, further comprising:
   detecting addition or removal of a second module of the switch during operation of the switch; and
   updating the status information based on information associated with the added or removed second module.

5. The method of claim 1, further comprising temporarily activating status indicators in response to active use of the status display panel, active use including navigation up or down the determined hierarchy using one or more navigation buttons.

6. The method of claim 5, wherein active use corresponds to one or more of the group consisting of activation of a line card user interface element, activation of a RPM user interface element, and activation of a switching fabric module (SFM) user interface element.

7. The method of claim 1, wherein the status information further includes power requirements, temperature limits, and cooling requirements.

8. The method of claim 1, further comprising applying a security policy to prevent undesirable configuration of the switch.

9. A non-transitory machine-readable medium comprising a plurality of machine-readable instructions which, when executed by one or more processors associated with a first module of a switch, are adapted to cause the one or more processors to perform a method comprising:

exchanging one or more messages with one or more detected modules of the switch to determine status information associated with each of the one or more detected modules, and a type of each of the one or more detected modules, wherein the first module is selected from a group of modules consisting of a switching module, a route processing module (RPM), and a cooling module, wherein the first module is interchangeably installable in one or more slots of the switch;

determining a hierarchy among the one or more detected modules of the switch based on the determined type of each of the modules of the switch;

organizing the status information associated with each of the one or more detected modules of the switch consistent with the determined hierarchy;

displaying the organized status information on a status display panel mounted on the first module of the switch on a plurality of status display screens, each of the status display screens displaying information at a corresponding level of the hierarchy and having one or more user interface elements for navigating between a current status display screen at a first level of the hierarchy to one or more of the status display screens at other levels of the hierarchy; and managing, by an operator, the switch using the organized status information displayed on the status display panel.

10. The non-transitory machine-readable medium of claim 9, the method further comprising detecting a fault in one of the one or more detected modules of the switch, the fault selected from a group consisting of insufficient cooling, insufficient power, loss of communication, and switch failure.

11. The non-transitory machine-readable medium of claim 10, the method further comprising detecting insufficient cooling in response to installation of a new module in the switch.

12. The non-transitory machine-readable medium of claim 9, wherein the status information further includes power requirements, temperature limits, and cooling requirements.

13. A switching device, comprising:

a first module, wherein the first module is selected from a group of modules consisting of a switching module, a route processing module (RPM), and a cooling module; and one or more second modules;

wherein the first module is configured to:

detect whether each of the one or more second modules are installed;

exchange one or more messages with the one or more second modules to determine status information associated with the one or more second modules, and a type of each of the one or more detected modules;

determine a hierarchy among the one or more second modules of the switching device based on the determined type of each of the modules of the switching device;

organize the status information associated with each of the one or more second modules of the switching device consistent with the determined hierarchy; and display the organized status information on a status display panel mounted on the first module of the switching device on a plurality of status display screens, each of the status display screens displaying information at a corresponding level of the hierarchy and having one or more user interface elements for navigating between a current status display screen at a first level of the hierarchy to one or more of the status display screens at other levels of the hierarchy; and wherein the organized status information displayed on the status display panel is usable by an operator to manage the switching device.

14. The switching device of claim 13, wherein the first module is further configured to detect a fault in one of the one or more second modules of the switching device, the fault selected from a group consisting of insufficient cooling, insufficient power, loss of communication, and switch failure.

15. The switching device of claim 14, wherein insufficient cooling is detected in response to installation of a new module in the switching device.

16. The switching device of claim 13, wherein the status information further includes power requirements, temperature limits, and cooling requirements.

17. The switching device of claim 13, further comprising a chassis including a plurality of slots, wherein the first module and one or more second modules of the switching device are installed in the plurality of slots; and wherein the first module is further configured to:

detect addition or removal of a third module during operation of the switching device; and update the status information based on information associated with the added or removed third module.

18. The switching device of claim 13, wherein the status display panel is a touchscreen liquid crystal display (LCD) and is configured to allow changes to a configuration of the switching device using the status display panel mounted on the first module of the switching device, wherein the status display panel may be partially or fully disabled to reduce power consumption and/or cooling needs of the first module of the switching device.

19. The switching device of claim 13, wherein the first module and one or more second modules are coupled together using one or more system management buses (SMBs) or one or more intelligent platform management interfaces (IPMIs).

20. The switching device of claim 13, wherein the first module is further configured to:

periodically reinterrogate the one or more second modules; and update the status information based on information associated with the reinterrogation.

* * * * *